Oct. 3, 1950      E. K. SHEAFFER      2,524,482
DEMOUNTABLE WHEEL
Filed June 10, 1947
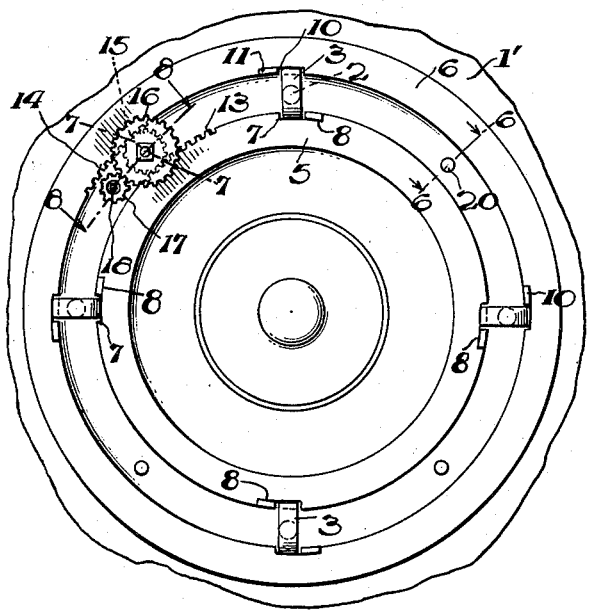
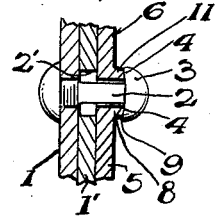
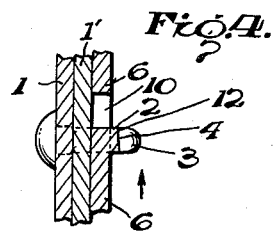
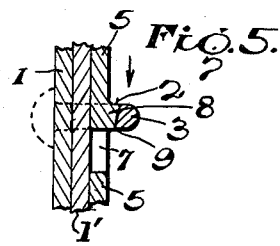
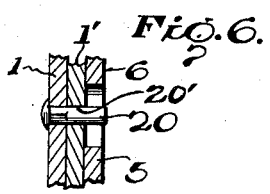
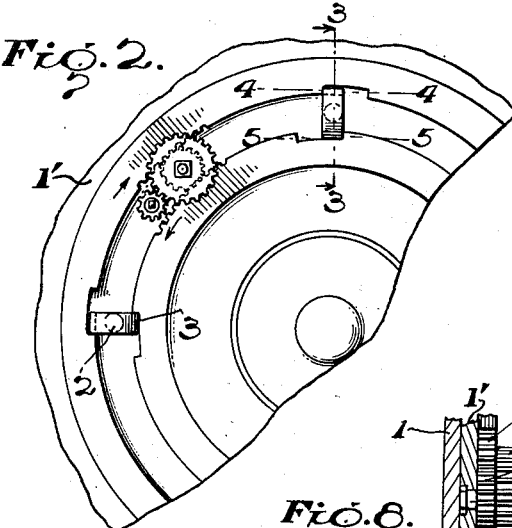
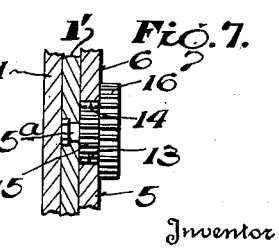
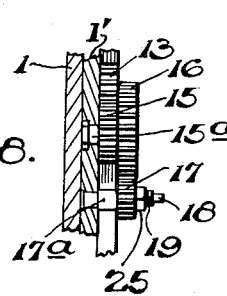
Inventor
E. K. Sheaffer.
By
Attorney Patented Oct. 3, 1950

2,524,482

UNITED STATES PATENT OFFICE 2,524,482

DEMOUNTABLE WHEEL

Edwin K. Sheaffer, Carrington, N. Dak.

Application June 10, 1947, Serial No. 753,650

1 Claim. (Cl. 301—9)

This invention relates to improvements in demountable wheels, and more particularly to the means employed for quickly and conveniently mounting or demounting a wheel on a vehicle.

The object of the invention is to so construct and arrange means between the wheel and the brake drum as to secure the wheel in fixed position on the drum without the necessity of releasing a number of nuts and bolts.

A further object of the invention is to provide a convenient means in the form of reversely-operated rings for bringing into use a series of oppositely operated wedges to insure a tight and effective binding action between the wheel and drum.

A further object of the invention is to provide a novel means for simultaneously reversely operating a pair of wedging rings to secure the wheel to the brake drum.

A still further object of the invention is to provide novel means for effectively locking the wedging rings in position.

These and other objects will be further described and pointed out in the description and claim.

In the accompanying drawing:

Figure 1 is a side view of a portion of a wheel showing the improvement, the parts being in position to assemble the wheel on the axle;

Figure 2 is a similar view showing the position of the wheel when in place;

Figure 3 is a detail section on the line 3—3 of Figure 2;

Figure 4 is a similar view on the line 4—4 of Figure 2;

Figure 5 is a similar view on the line 5—5 of Figure 2;

Figure 6 is a similar view on the line 6—6 of Figure 1;

Figure 7 is a detail section on the line 7—7 of Figure 1; and

Figure 8 is a detail section on the line 8—8 of Figure 1.

Referring now to the drawing, a wheel 1' is adapted to be mounted to a brake drum 1 in the usual manner, and to be secured thereto by studs 2. Each stud is fixed with reference to the drum and provided at its outer end with an elongated head 3 and the wheel 1' is provided with apertures 2' that will freely pass the studs 2 and their heads. The inner surfaces of the head beyond the body of the stud incline inwardly from the body portion to the outer edge, as shown at 4—4.

Cooperating with the studs are two rings 5 and 6 which freely bear against the wheel 1'. The inner ring 5 is formed on its peripheral edge with notches 7, and adjacent each notch is an outwardly projecting lug 8 inclined on its face to form a wedge surface 9. The outer ring 6 is spaced from the inner ring and is provided on its inner peripheral edge with notches 10, and adjacent each notch is a lug 11 inclined on its face to form a wedge surface 12.

The wedging surfaces incline in opposite directions and are on opposite sides of the two sets of notches, for a purpose to be hereinafter described.

The peripheral edge of the inner ring 5 is provided with a series of gear teeth 13, while the inner peripheral edge of the outer ring 6 is provided with a series of gear teeth 14, the gear teeth 13 and 14 being disposed opposite each other.

Mounted on a stub shaft 15a extending from the wheel 1' is a pinion 15, which meshes with the gear teeth 13 and 14. Also mounted on the stub shaft 15a is a gear wheel 16, and meshing with this gear wheel 16 is a locking pinion 17, mounted on a stub shaft 17a having a square outer end 18 and a threaded portion 19.

20 indicates a series of lugs projecting from the drum to fit in openings 20' in the wheel to properly position the parts when fitting the wheel on the drum.

The body portion of each of the studs 2 is about equal to the space between the two rings, so that the projecting portions of the heads overlap the outer peripheral edge of the inner ring 5, and the inner peripheral edge of the outer ring 6. Thus, when applying the rings, the respective heads of the studs are brought into registry with the notches, and by applying a wrench or the like to the square end 18 of the stub shaft 17a and rotating said shaft, the gearing meshing with the gear teeth on the rings rotates the latter in opposite directions. In operating the gearing, the rings 5 and 6 are reversely rotated, which causes the wedges on the two rings to engage the opposed inclined faces of the heads of the studs and thus bind the wheel and drum together.

When the binding action between the heads and wedges has been effected, a nut 25 is screwed on the threaded end of the stub shaft 17a to clamp the pinion in locked position.

To remove the wheel from the drum, the nut 25 is released, a wrench is applied to the square end of the shaft 17a and the gears are reversed. This reverses the movement of the rings and hence withdraws the wedges from the heads of the studs, and at the same time the notches are brought into line with the heads. When the rings are in this position, they can be removed and the wheel can be withdrawn from the drum.

By providing the simultaneous reverse movement of the rings, the wedges create a direct longitudinal force on the studs and consequently a tight and effective binding action between the parts results.

What I claim is:

The combination of a demountable wheel and drum structure, including a wheel and a drum, a plurality of lugs on the drum to extend through snugly fitting openings in the wheel, a plurality of headed studs extending from the drum and through openings in the wheel, the inner surface of each head being inclined from its outer edge toward the forward end of the body portion of said stud and wedge-shaped at right angles to the inclined surfaces, a pair of concentric rings spaced substantially the thickness of said studs and freely bearing on the wheel to cooperate with the stud heads, the inner ring having notches on its outer peripheral edge and the outer ring having notches on its inner peripheral edge for passage of the heads, wedges on the rings adjacent the notches, the wedges on the rings being disposed to engage behind the inclined surfaces of the heads when the rings are reversely rotated, gear teeth on the outer peripheral edge of the inner ring and gear teeth on the inner peripheral edge of the outer ring, a pinion mounted on the wheel engaging the gear teeth on the rings to rotate the latter to bring the wedges into wedging relation with the inclined surfaces on opposite sides of the heads, a second pinion on said wheel cooperative with the first-mentioned pinion, and a nut for holding the second pinion against rotation.

EDWIN K. SHEAFFER.

REFERENCES CITED

The following references are of record in the file of this patent:

UNITED STATES PATENTS

| Number | Name | Date |
| --- | --- | --- |
| 2,237,702 | Harrison | Apr. 8, 1941 |

FOREIGN PATENTS

| Number | Country | Date |
| --- | --- | --- |
| 644,288 | France | Oct. 5, 1928 |